(12) United States Patent
Mizutani

(10) Patent No.: US 12,517,103 B2
(45) Date of Patent: Jan. 6, 2026

(54) ODOR DETECTION DEVICE AND PLANT STATUS DETECTION SYSTEM

(71) Applicant: SINTOKOGIO, LTD., Nagoya (JP)

(72) Inventor: Manase Mizutani, Nagoya (JP)

(73) Assignee: SINTOKOGIO, LTD., Nagoya (JP)

( * ) Notice: Subject to any disclaimer, the term of this patent is extended or adjusted under 35 U.S.C. 154(b) by 287 days.

(21) Appl. No.: 18/205,720

(22) Filed: Jun. 5, 2023

(65) Prior Publication Data

US 2024/0019411 A1     Jan. 18, 2024

(30) Foreign Application Priority Data

Jul. 14, 2022   (JP) .................................. 2022-113260

(51) Int. Cl.
   *G01N 33/00*     (2006.01)
(52) U.S. Cl.
   CPC ..... *G01N 33/0098* (2013.01); *G01N 33/0014* (2013.01)
(58) Field of Classification Search
   None
   See application file for complete search history.

(56) References Cited

U.S. PATENT DOCUMENTS

| | | | |
|---|---|---|---|
| 9,757,710 B1* | 9/2017 | Xu .......................... | B01J 20/226 |
| 2008/0190289 A1* | 8/2008 | Muller .................... | B01D 53/02 |
| | | | 95/25 |
| 2010/0075123 A1* | 3/2010 | Masel .................... | C07C 51/412 |
| | | | 204/155 |
| 2017/0248566 A1 | 8/2017 | Yamada et al. | |
| 2019/0361308 A1* | 11/2019 | Park ........................ | G02F 1/163 |
| 2020/0333310 A1 | 10/2020 | Lee et al. | |
| 2021/0055275 A1 | 2/2021 | Park et al. | |

FOREIGN PATENT DOCUMENTS

| | | | | |
|---|---|---|---|---|
| CN | 114230821 A | * | 3/2022 | ............. C02F 1/285 |
| JP | 2017-156346 A | | 9/2017 | |
| JP | 2019074450 A | * | 5/2019 | |
| WO | WO-2006125739 A | * | 11/2006 | ............. A61L 9/014 |

OTHER PUBLICATIONS

Enearepuadoh, O.V. et al. "Synthesis, Characterization and Adsorption Study of Metal Organic Framework of Copper (II) Benzene-1, 4-Dicarboxylate (Cu-MOF) on Crude Oil", Progress in Materials Chemistry and Physics, vol. 2, pp. 1-14. (Year: 2021).*

Xing, G. et al., "A Probe-Free Electrochemical Immunosensor for Methyl Jasmonate Based on a Cu-MOF-Carboxylated Graphene Oxide Platform", RSC Advances, vol. 12, pp. 16688-16695. (Year: 2022).*

(Continued)

*Primary Examiner* — Daniel S Larkin
(74) *Attorney, Agent, or Firm* — Faegre Drinker Biddle & Reath LLP

(57) ABSTRACT

An odor detection device includes a filter including a metal-organic framework in which a metal ion and an organic ligand are bonded and an odor sensor detecting a plant-derived odor substance having a straight chain structure which is included in a sample gas passing through the filter. The filter transmits the odor substance included in the sample gas and removes a volatile compound other than the odor substance from the sample gas.

7 Claims, 6 Drawing Sheets

(56) References Cited

OTHER PUBLICATIONS

Zhang, R. et al. "Highly Effective Removal of Pharmaceutical Compounds from Aqueous Solution by Magnetic Zr-Based MOFs Composites", Ind. Eng. Chem. Res, vol. 58, pp. 3876-3884. (Year: 2019).*
Rojas, S. et al., "Metal-Organic Frameworks as Efficient Oral Detoxifying Agents", J. Am. Chem. Soc. Vol. 140, pp. 9581-9586. (Year: 2018).*
Extended European Search Report issued Dec. 8, 2023 in Application No. 23177561.0.
Alireza Sanaeifar et al, "Early detection of contamination and defect in foodstuffs by electronic nose: A review", TRAC Trends in Analytical Chemistry, vol. 97, Sep. 21, 2017, p. 257-p. 271, XP085268081.

* cited by examiner

ODOR DETECTION DEVICE AND PLANT STATUS DETECTION SYSTEM

CROSS-REFERENCE TO RELATED APPLICATIONS

This application is based on and claims the benefit of priority from Japanese Patent Application No. 2022-113260 filed on Jul. 14, 2022, the entire contents of which are incorporated herein by reference.

TECHNICAL FIELD

The present disclosure relates to an odor detection device and a plant status detection system.

BACKGROUND

Technology for detecting a substance included in a gas is known. For example, Patent Document 1 discloses a molecule detection device including a collection unit that collects a gas to be detected, a substitution unit that produces a substitution product by substituting a part of a molecular structure of a detected molecule included in the collected gas to be detected, a detector that includes a plurality of detection cells collecting the detected molecule or the substitution product, and a discriminator that discriminates the detected molecule based on a signal pattern of a detection signal which is generated when the detected molecule or the substitution product is collected by organic substance probes of the plurality of detection cells.

PATENT DOCUMENT

[Patent Document 1] Japanese Unexamined Patent Publication No. 2017-156346

SUMMARY

It is known that a plant emits various odor substances according to a plant status thereof. For example, plant emits plant hormones, such as leaf alcohol (cis-3-hexen-1-ol) or leaf aldehyde (trans-2-hexenal), known as green fragrance substances, as a reaction for protection from insect damage. When fruits mature, plant emits a plant hormone called ethylene. By detecting and analyzing such plant hormones as odor substances, it is possible to detect a health status or a growth status of plants.

However, various volatile compounds emitted from plants or agricultural chemicals are included in the air of farms. When a volatile compound other than an odor substance is included in a sample gas sampled in the farms, there is concern that detection of an odor substance will be hindered due to the volatile compounds and detection accuracy of the odor substance will decrease.

Therefore, the present disclosure is for improving detection accuracy of a plant-derived odor substance.

An odor detection device according to an aspect includes a filter including a metal-organic framework in which a metal ion and an organic ligand are bonded and an odor sensor detecting a plant-derived odor substance having a straight chain structure which is included in a sample gas passing through the filter. The filter transmits the odor substance included in the sample gas and removes volatile compounds other than the odor substance from the sample gas.

In the odor detection device according to the aspect, when the sample gas passes through the filter, plant-derived odor substances are transmitted by the filter and volatile compounds other than the odor substances are removed from the sample gas. As a result, since the sample gas from which the volatile compounds have been removed is supplied to the odor sensor, it is possible to improve detection accuracy of the odor substance.

According to the present disclosure, it is possible to improve detection accuracy of a plant-derived odor substance.

DETAILED DESCRIPTION

Summary of Embodiment of Present Disclosure

Figure 1:
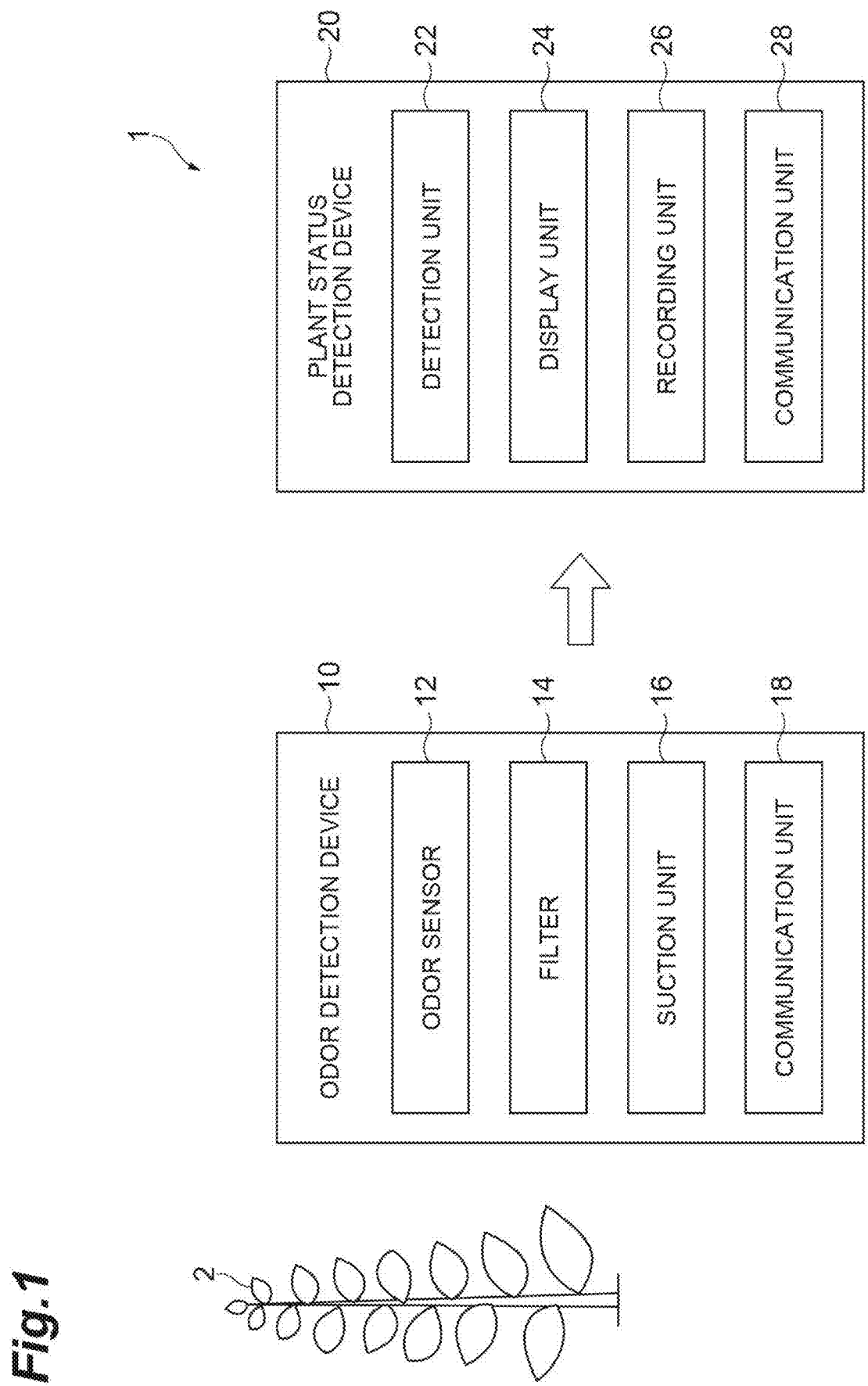
FIG. 1 is a block diagram illustrating a functional configuration of a plant status detection system according to an embodiment.

Summaries of an embodiment of the present disclosure will be first described below.

An odor detection device according to an aspect of the present disclosure includes a filter including a metal-organic framework in which a metal ion and an organic ligand are bonded and an odor sensor detecting a plant-derived odor substance having a straight chain structure which is included in a sample gas passing through the filter. The filter transmits the odor substance included in the sample gas and removes a volatile compound other than the odor substance from the sample gas. In the odor detection device according to the aspect, since a volatile compound other than an odor substance is removed by the filter, it is possible to prevent detection of the odor substance from being hindered by the volatile compound. Accordingly, it is possible to improve detection accuracy of the odor substance in the odor sensor.

In another aspect of the odor detection device according to the present disclosure, the metal-organic framework may be a porous medium including pores with a rectangular or circular sectional shape. By using the metal-organic framework including pores with a rectangular or circular sectional shape, it is possible to selectively transmit an odor substance included in the sample gas.

In another aspect of the odor detection device according to the present disclosure, the pores may have an opening size ranging from 2 nm to 100 nm. By setting the opening diameter of the pores to range from 2 nm to 100 nm, it is possible to selectively transmit an odor substance included in the sample gas.

In another aspect of the odor detection device according to the present disclosure, the filter may remove a volatile compound having a carboxyl group from the sample gas. By removing the volatile compound having a carboxyl group, it is possible to prevent the volatile compound from badly affecting detection of an odor substance. Accordingly, it is possible to improve detection accuracy of an odor substance.

In another aspect of the odor detection device according to the present disclosure, the filter may remove jasmonic acids or a salicylic acid from the sample gas. The jasmonic acids and the salicylic acid are kinds of plant hormone serving to adjust physiological functions of plants and large amounts thereof are present in farms. When a large amount of jasmonic acids or the salicylic acid is included in the sample gas, detection of an odor substance may be hindered. By removing the jasmonic acid or salicylic acid using the filter, it is possible to improve detection accuracy of an odor substance.

In another aspect of the odor detection device according to the present disclosure, the metal-organic framework may include a benzene dicarboxylic acid or a benzene tricarboxylic acid as the organic ligand. When the benzene dicarboxylic acid or the benzene tricarboxylic acid is included as the organic ligand, the carboxyl group of the volatile compound and the carboxyl group of the organic ligand are chemically bonded to form a dimer. Since adsorption of the volatile compound onto the filter is promoted by this bond, it is possible to effectively remove the volatile compound using the filter.

In another aspect of the odor detection device according to the present disclosure, the metal-organic framework may include one of a silver ion, a copper ion, an iron ion, a zinc ion, an aluminum ion, a nickel ion, and a chromium ion as the metal ion. Since such metal ions are included, it is possible to form a metal-organic framework selectively transmitting an odor substance.

In another aspect of the odor detection device according to the present disclosure, the odor sensor may detect at least one of leaf alcohol, leaf aldehyde, and ethylene as the odor substance. Leaf alcohol, leaf aldehyde, and ethylene are plant hormones which are emitted based on a health status or a growth status of plant. Accordingly, by detecting such an odor substance, it is possible to acquire information on the health status or the growth status of plant.

A plant status detection system according to another aspect of the present disclosure includes: the odor detection device according to the present disclosure and a plant status detection device outputting information indicating a plant status based on the odor substance detected by the odor sensor of the odor detection device. As described above, since a volatile compound other than an odor substance is removed by the filter of the odor detection device, it is possible to detect an odor substance with high accuracy. Accordingly, it is possible to detect a plant status with high accuracy based on a result of detection of the odor substance.

DESCRIPTION OF EMBODIMENT OF PRESENT DISCLOSURE

Hereinafter, an embodiment of the present disclosure will be described in detail with reference to the accompanying drawings. In describing the drawings, the same elements will be referred to by the same reference signs and repeated description will be omitted.

FIG. 1 is a block diagram illustrating a functional configuration of a plant status detection system including an odor detection device according to an embodiment. The plant status detection system 1 illustrated in FIG. 1 detects a plant-derived odor substance and detects a plant status. The plant status includes a health status and a growth status of plant. The plant status detection system 1 includes an odor detection device 10 and a plant status detection device 20.

The odor detection device 10 detects an odor substance emitted from a plant 2. The plant 2 is a plant, such as vegetables, fruit trees, or flowers, which are growing in a farm, such as a plant factory, a field, or a plastic greenhouse. The odor detection device 10 is provided in the farm to detect an odor substance. As illustrated in FIG. 1, the odor detection device 10 includes an odor sensor 12, a filter 14, a suction unit 16, and a communication unit 18.

Figure 2:
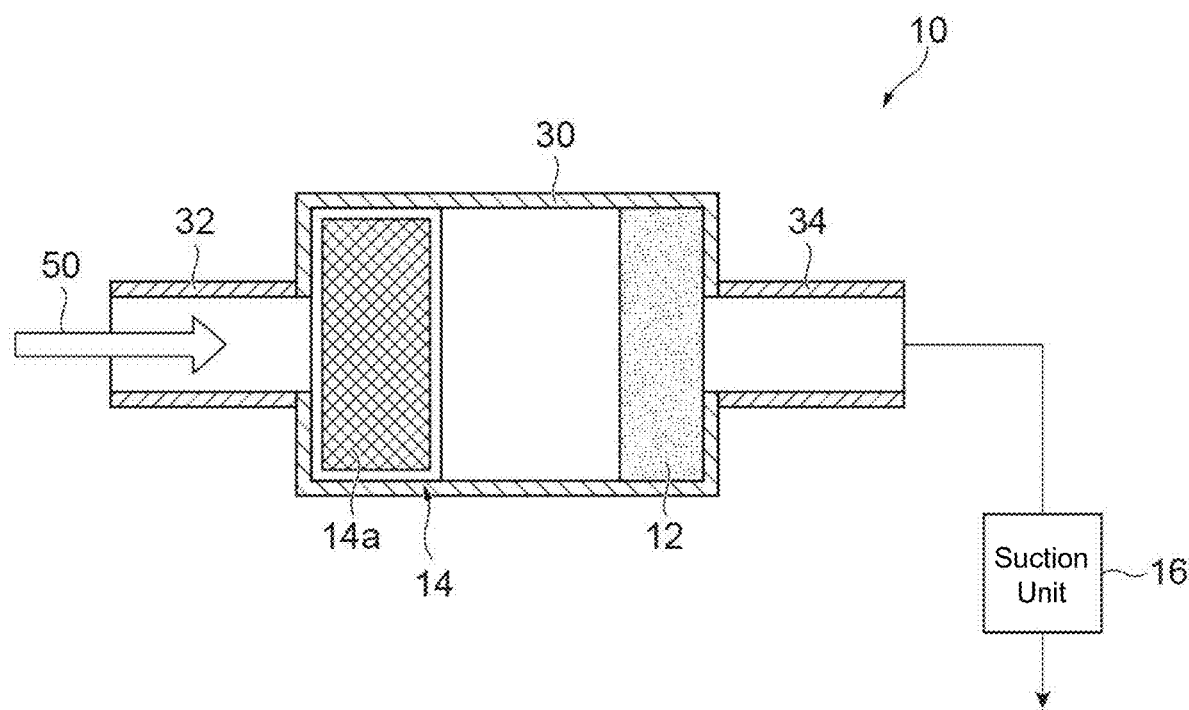
FIG. 2 is a diagram illustrating an example of a configuration of an odor detection device according to the embodiment.

FIG. 2 illustrates an example of a configuration of the odor detection device 10 according to the embodiment. As illustrated in FIG. 2, the odor sensor 12 and the filter 14 are disposed in a container 30. An intake pipe 32 and an exhaust pipe 34 communicating with the internal space of the container 30 are connected to the container 30. The suction unit 16 is connected to the exhaust pipe 34. The suction unit 16 is, for example, a vacuum pump. When the suction unit 16 operates to depressurize the internal space of the container 30, a sample gas 50 is guided into the container 30 via the intake pipe 32. The sample gas 50 is air in the farm. The sample gas 50 includes various volatile compounds including an odor substance.

The odor sensor 12 detects an odor substance included in the sample gas 50. Specifically, the odor sensor 12 detects at least one odor substance of leaf alcohol, leaf aldehyde, and ethylene. A gas sensor of, for example, a semiconductor type, an electrochemical type, or a quartz oscillator type is used as the odor sensor 12. For example, the odor sensor 12 is a VOC sensor including an organic film of polyaniline and an oxide semiconductor, such as a tin oxide ($SnO_2$). As long as it can detect an odor substance, a sensor of a type different from the aforementioned types may be used as the odor sensor 12. When two or more kinds of odor substances are detected, the odor detection device 10 may include two or more odor sensors 12.

Figure 3A:
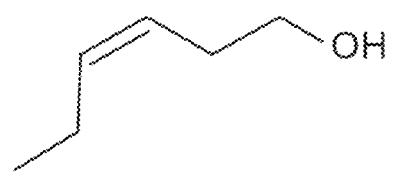
FIG. 3A is a diagram illustrating a molecular structure of leaf alcohol.
Figure 3B:
FIG. 3B is a diagram illustrating a molecular structure of leaf aldehyde.

An odor substance detected by the odor sensor 12 is a plant-derived volatile compound and includes leaf alcohol, leaf aldehyde, and ethylene. Leaf alcohol and leaf aldehyde are plant hormones that are emitted from the plant 2 as a protective reaction when insect damage due to insects or animal occurs. These plant hormones are green fragrance substances giving rise to the odor of fresh green leaves. FIG. 3A illustrates a molecular structure of leaf alcohol, and FIG. 3B illustrates a molecular structure of the leaf aldehyde. Leaf alcohol and leaf aldehyde are low-molecular-weight compounds having a straight chain structure. By detecting leaf alcohol and leaf aldehyde, it is possible to detect occurrence of insect damage.

Figure 3C:
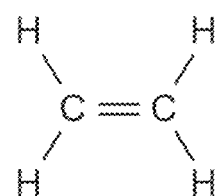
FIG. 3C is a diagram illustrating a molecular structure of ethylene.

Ethylene is a plant hormone which is emitted when fruits or the like mature. FIG. 3C illustrates a molecular structure of ethylene. Similarly to leaf alcohol and leaf aldehyde, ethylene is a low-molecular-weight compound having a straight chain structure. By detecting ethylene, it is possible to detect a growth status of the plant 2. The odor sensor 12 may detect an odor substance that can detect a status of the plant 2 in addition to leaf alcohol, leaf aldehyde, and ethylene.

The filter 14 is disposed upstream from the odor sensor 12 in a flow direction of the sample gas 50. The filter 14 transmits the odor substance included in the sample gas 50 and removes a volatile compound other than the odor substance from the sample gas 50. The filter 14 includes a metal-organic framework (MOF) 14a in which a metal ion and an organic ligand are bonded. The metal-organic framework 14a is disposed to be in close contact with an inner wall of a container 30 in which the metal-organic framework 14a is accommodated in an air-permeability bag of a nonwoven fabric.

Silver ions, copper ions, iron (II) ions, iron (III) ions, zinc ions, aluminum ions, nickel ions, and chromium ions can be used as the metal ions used in the metal-organic framework 14a. Particularly, copper ions have high availability and good adsorption characteristics. A benzene dicarboxylic acid and a benzene tricarboxylic acid can be used as the organic-ligand used in the metal-organic framework 14a. A phthalic acid, an isophthalic acid, and a terephthalic acid can be used as the benzene dicarboxylic acid. A trimesic acid can be used as the benzene tricarboxylic acid. The benzene dicarboxylic acid and the benzene tricarboxylic acid are organic ligands having a carboxyl group.

The metal-organic framework 14a has a crystal structure in which nano-size apertures are regularly formed by coordinate bonding between the metal ion and the organic ligand. Accordingly, the metal-organic framework 14a is a porous medium including a plurality of pores 14h (see FIGS. 4A and 4B). The pores 14h formed in the metal-organic framework 14a have a circular or rectangular sectional shape. In this specification, a circular shape includes an elliptical shape. The pores 14h have a polygonal sectional shape.

In this embodiment, the pores 14h formed in the metal-organic framework 14a have an opening size ranging from 2 nm to 100 nm. The opening size of the pores 14h means a width of an opening of each pore 14h formed in the filter 14. For example, when the opening of the pores 14h has a circular shape, a diameter thereof is defined as the opening size of the pores 14h. When the opening of the pores 14h has a rectangular shape, a diameter of a circle inscribed in the rectangular opening is defined as the opening size of the pores 14h. The pores 14h formed in the metal-organic framework 14a have a substantially constant opening size in a longitudinal direction thereof. The metal-organic framework 14a may have a specific surface area ranging from 500 $m^2/g$ to 5000 $m^2/g$ and have a pore volume of 0.1 $m^2/g$ to 1.0 $m^2/g$.

Figure 4A:
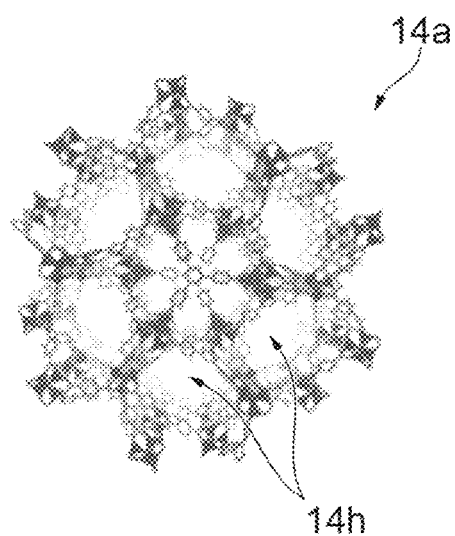
FIG. 4A is a sectional view illustrating a metal-organic framework including pores with a circular sectional shape.
Figure 4B:
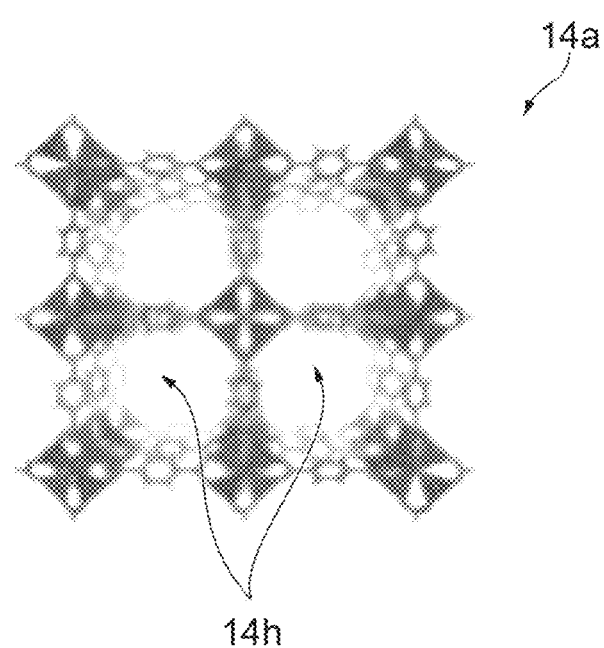
FIG. 4B is a sectional view illustrating a metal-organic framework including pores with a rectangular sectional shape.

The sectional shape and the opening size of the pores 14h are determined based on a combination of the metal ion and the organic ligand. For example, when a benzene dicarboxylic acid is used as the organic ligand, a metal-organic framework 14a including pores 14h with a circular sectional shape is formed as illustrated in FIG. 4A. On the other hand, when a benzene tricarboxylic acid is used as the organic ligand, a metal-organic framework 14a including pores 14h with a rectangular sectional shape is formed as illustrated in FIG. 4B.

The filter 14 selectively transmits an odor substance having a straight chain structure using the pores 14h of the metal-organic framework 14a and removes a volatile compound other than the odor substance. An example of the volatile compound which is removed from the sample gas 50 by the filter 14 is a volatile compound including a carboxyl group (—COOH). Examples of the volatile compound including a carboxyl group include jasmonic acids and a salicylic acid.

Figure 5:
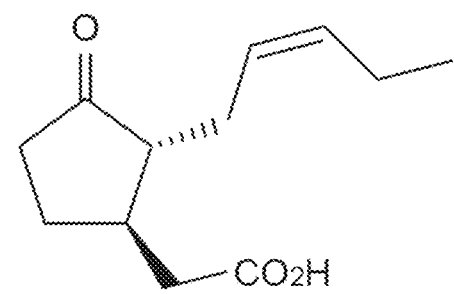
FIG. 5 is a diagram illustrating a molecular structure of a jasmonic acid.

The jasmonic acids include a jasmonic acid and a jasmonic acid analog. Examples of the jasmonic acid analog include methyl jasmonate, methyl dihydrojasmonate, and a tuberonic acid. The jasmonic acids are volatile compounds which are widely present in the plant world and are kinds of plant hormones serving to adjust physiological functions of plant. FIG. 5 illustrates a molecular structure of a jasmonic acid. As illustrated in FIG. 5, the jasmonic acid is a cyclic compound including a five-membered ring and including a carboxyl group as a functional group. The jasmonic acid has a complex molecular structure with a larger molecular weight than an odor substance to be detected.

Figure 6:
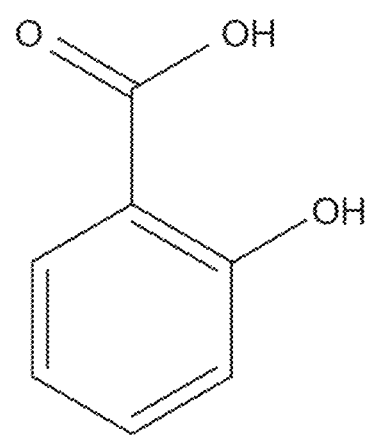
FIG. 6 is a diagram illustrating a molecular structure of a salicylic acid.

The salicylic acid is a kind of plant hormone serving to perform physiological functions of plant. FIG. 6 illustrates a molecular structure of the salicylic acid. As illustrated in FIG. 6, the salicylic acid has a carboxyl group and a hydroxyl group and has a complex molecular structure with a larger molecular weight than an odor substance to be detected.

As described above, the filter 14 collects jasmonic acids and a salicylic acid with a relatively complex molecular structure from various volatile compounds included in the sample gas 50. Particularly, when a benzene dicarboxylic acid or a benzene tricarboxylic acid is included as the organic ligand in the metal-organic framework 14a of the filter 14, the carboxyl group of the jasmonic acids or the salicylic acid is ionically bonded to the metal-organic framework 14a. More specifically, the carboxyl group of the jasmonic acids or the salicylic acid and the carboxyl group of the organic ligand are chemically bonded to form a dimer. Through this bonding, adsorption of the carboxyl group of the jasmonic acids or the salicylic acid on the filter 14 is promoted.

On the other hand, the filter 14 transmits an odor substance, such as leaf alcohol, leaf aldehyde, or ethylene having a relatively simple molecular structure. The sample gas 50 passing through the filter 14 is sent to the odor sensor 12. The odor sensor 12 detects the odor substance included in the sample gas 50 and outputs waveform data indicating the result of detection.

The communication unit 18 is, for example, a wireless communication device. The communication unit 18 transmits the waveform data output from the odor sensor 12 to the plant status detection device 20.

The plant status detection device 20 outputs information indicating a status of the plant 2 based on the result of detection of an odor substance from the odor detection device 10. The plant status detection device 20 is a computer including a processor, a storage device, an input device, and a display device. The plant status detection device 20 may be a stationary or portable personal computer or workstation or may be a mobile terminal, such as a notebook PC, a tablet terminal, a smartphone, or a PDA.

The plant status detection device 20 includes a detection unit 22, a display unit 24, a recording unit 26, and a communication unit 28. The communication unit 28 is, for example, a wireless communication device and receives waveform data transmitted from the odor detection device 10.

The detection unit 22 estimates the status of the plant 2 by analyzing the waveform data output from the odor sensor 12. For example, the detection unit 22 acquires a concentration of an odor substance included in the sample gas 50 from an intensity of the waveform data and determines the status of the plant 2 based on the acquired concentration. For example, the detection unit 22 estimates the status of the plant 2 with reference to a table indicating a relationship between the concentration of an odor substance and the status of the plant 2.

Specifically, when the odor substance to be detected is leaf alcohol or leaf aldehyde, the detection unit 22 determines the health status of the plant 2 from an output of the odor sensor 12. For example, the detection unit 22 determines that there is a low likelihood that insect damage will occur when the concentration of leaf alcohol or leaf aldehyde in the sample gas 50 is low, and determines that there is a high likelihood that insect damage will occur when the concentration of leaf alcohol or leaf aldehyde in the sample gas 50 is high.

When the odor substance to be detected is ethylene, the detection unit 22 determines the growth status of the plant 2 based on the output of the odor sensor 12. For example, the detection unit 22 determines that a degree of maturity of the plant 2 is low when the concentration of ethylene in the sample gas 50 is low, and determines that the degree of maturity of the plant 2 is high when the concentration of ethylene in the sample gas 50 is high.

The display unit 24 displays information indicating the status of the plant 2 detected by the detection unit 22 on a display device. For example, the display unit 24 may display the status of the plant 2 on the display device with categorization such that the health status or the growth status of the plant 2 can be visually recognized. The recording unit 26 records the information indicating the status of the plant 2 on a storage device.

As described above, when an odor substance is detected using the odor detection device 10, first, the suction unit 16 operates to depressurize the internal space of the container 30. Accordingly, the sample gas 50 is guided into the intake pipe 32 and passes through the filter 14 disposed in the container 30. At this time, a volatile compound with a carboxyl group included in the sample gas 50 is collected by the filter 14. On the other hand, an odor substance with a straight chain structure included in the sample gas 50 passes through the pores 14h of the filter 14 and is sent to the odor sensor 12 along with the sample gas 50. Then, the odor substance in the sample gas 50 is detected by the odor sensor 12. Thereafter, the sample gas 50 is discharged to the outside of the odor detection device 10 via the exhaust pipe 34. Information on the odor substance detected by the odor sensor 12 is transmitted to the plant status detection device 20. The plant status detection device 20 outputs information indicating the status of the plant 2 by analyzing the information indicating the result of detection of the odor substance.

In the odor detection device 10, the volatile compounds other than the odor substance are removed by the filter 14. Accordingly, it is possible to prevent detection of an odor substance from being hindered due to the volatile compounds and to improve detection accuracy of the odor substance in the odor sensor 12. As a result, it is possible to detect the status of the plant 2 with high accuracy.

While the odor detection device and the plant status detection system according to the embodiments have been described above, the present disclosure is not limited to the embodiments and can be modified in various forms without departing from the gist of the present disclosure. That is, it should be noted that the aforementioned embodiments are form exemplification and is not intended to limit the scope of the present disclosure. The aforementioned embodiments can be combined unless technical conflictions arise.

REFERENCE SIGNS LIST

1: Plant status detection system, 2: Plant, 10: Odor detection device, 12: Odor sensor, 14: Filter, 50: Sample gas.

What is claimed is:

1. An odor detection device comprising:
   a filter including a metal-organic framework in which a metal ion and an organic ligand are bonded; and
   an odor sensor detecting a plant-derived odor substance having a straight chain structure, which is included in a sample gas passing through the filter,
   wherein the filter transmits the odor substance included in the sample gas and removes jasmonic acids from the sample gas.

2. The odor detection device according to claim 1, wherein the metal-organic framework is a porous medium including pores with a rectangular or circular sectional shape.

3. The odor detection device according to claim 2, wherein the pores have an opening width of 2 nm to 100 nm.

4. The odor detection device according to claim 1, wherein the metal-organic framework includes a benzene dicarboxylic acid or a benzene tricarboxylic acid as the organic ligand.

5. The odor detection device according to claim 4, wherein the metal-organic framework includes one of a silver ion, a copper ion, an iron ion, a zinc ion, an aluminum ion, a nickel ion, and a chromium ion as the metal ion.

6. The odor detection device according to claim 1, wherein the odor sensor detects at least one of leaf alcohol, leaf aldehyde, and ethylene as the odor substance.

7. A plant status detection system comprising:
   the odor detection device according to claim 1; and
   a plant status detection device to output information indicating a plant status based on the odor substance detected by the odor sensor of the odor detection device.

* * * * *